United States Patent
Geerken et al.

(10) Patent No.: US 10,323,986 B2
(45) Date of Patent: Jun. 18, 2019

(54) METHOD FOR DETERMINING THE TEMPERATURE OF A STRAND

(71) Applicant: Sikora AG, Bremen (DE)

(72) Inventors: Norbert Geerken, Bremen (DE); Hilmar Bolte, Bremen (DE); Harald Sikora, Bremen (DE)

(73) Assignee: Sikora AG, Bremen (DE)

( * ) Notice: Subject to any disclaimer, the term of this patent is extended or adjusted under 35 U.S.C. 154(b) by 0 days.

(21) Appl. No.: 15/679,287

(22) Filed: Aug. 17, 2017

(65) Prior Publication Data

US 2018/0052054 A1 Feb. 22, 2018

(30) Foreign Application Priority Data

Aug. 18, 2016 (DE) .................. 10 2016 115 348

(51) Int. Cl.
*G01N 1/00* (2006.01)
*G01J 5/00* (2006.01)
(Continued)

(52) U.S. Cl.
CPC ........... *G01J 5/0003* (2013.01); *G01J 5/0022* (2013.01); *G01J 5/0096* (2013.01); *G01J 5/0887* (2013.01); *G01J 5/10* (2013.01); *G01J 5/522* (2013.01); *C03B 37/0253* (2013.01); *C03B 2205/72* (2013.01); *G01J 5/0806* (2013.01); *G01J 2005/0048* (2013.01)

(58) Field of Classification Search
CPC .. G01N 21/35; G01N 21/3504; G01N 33/085; A61B 5/14532; A61B 5/1455
See application file for complete search history.

(56) References Cited

U.S. PATENT DOCUMENTS

| 2001/0031319 A1* | 10/2001 | Ohba ................... C03C 25/106 427/551 |
| 2006/0256339 A1* | 11/2006 | Lowney ............ G01N 21/1702 356/432 |

(Continued)

FOREIGN PATENT DOCUMENTS

| DE | 102011103686 A1 | 12/2011 |
| JP | 47-009196 | 1/1972 |

(Continued)

OTHER PUBLICATIONS

EP 17186419; Filing Date Aug. 16, 2017; European Search Report; dated Jan. 4, 2018; 10 pages.

(Continued)

*Primary Examiner* — David P Porta
*Assistant Examiner* — Mamadou Faye
(74) *Attorney, Agent, or Firm* — Barclay Damon LLP

(57) ABSTRACT

A method for determining the temperature of a strand comprises disposing the strand along a background radiator of known temperature. Receiving the strand using a spatially resolving thermal imaging sensor in front of the background radiator while the strand is being disposed along its longitudinal axis. Forming an integral across a measuring value area, the integral configured to detect a complete strand portion located in front of the background radiator of the thermal imaging sensor. deducing the temperature of the strand by comparing the formed integral with a reference value.

18 Claims, 3 Drawing Sheets

(51) Int. Cl.
*G01J 5/08* (2006.01)
*G01J 5/10* (2006.01)
*G01J 5/52* (2006.01)
*C03B 37/025* (2006.01)

(56) References Cited

U.S. PATENT DOCUMENTS

| | | | | |
|---|---|---|---|---|
| 2013/0235897 A1* | 9/2013 | Bouteyre | ............... | F03D 1/065 |
| | | | | 374/4 |
| 2015/0316417 A1* | 11/2015 | Sikora | ................... | G01J 5/0896 |
| | | | | 374/121 |
| 2016/0033434 A1* | 2/2016 | Beuth | .................... | B23K 31/02 |
| | | | | 702/136 |

FOREIGN PATENT DOCUMENTS

| | | |
|---|---|---|
| JP | 6-211535 | 8/1994 |
| WO | 99/36367 A1 | 7/1999 |
| WO | 2014/090994 A2 | 6/2014 |
| WO | 2016/096201 A1 | 6/2016 |

OTHER PUBLICATIONS

JP20170156903; Filing Date Aug. 15, 2017; Notification of Reasons for Refusal; Dated Mar. 5, 2019 (7 pages).
Yuichi Kamata et al; "Evaluation of Measurement in Mid-High Temperature Range by Near Infrared Two-Color Imaging Pyrometry"; Proceedings of the Visualization Society of Japan, Sep. 30, 2009; vol. 291 No. 9; pp. 35-41 (7 pages).

* cited by examiner

METHOD FOR DETERMINING THE TEMPERATURE OF A STRAND

CROSS REFERENCE TO RELATED INVENTION

This application is based upon and claims priority to, under relevant sections of 35 U.S.C. § 119, German Patent Application No. 10 2016 115 348.6, filed Aug. 18, 2016, the entire contents of which are hereby incorporated by reference.

BACKGROUND

The invention relates to a method for determining the temperature of a strand of material such as, a glass fibre or a wire. For example, glass fibres are produced in drawing towers which can be considerably taller than 30 meters. In this case, a glass fibre is drawn from a preform about 100 to 250 mm in diameter that is heated to melting temperature at a speed of almost 3,000 m/min. If it is to be used for today's data transmission routes for example, the glass fibre itself typically has a diameter in the region of 125 µm, which must be manufactured with accuracies in the nanometre range.

In this case, the drawing temperature of the glass fibre in the hot region of the drawing tower is of key importance. If possible, the temperature of the preform should be regulated such that, given variable drawing speed, exact diameters of the glass fibre are already achieved in the start-up process, in order to minimise rejects. The glass fibre runs through a cooling stretch in the lower region of the drawing tower, in which it is cooled as far as possible to a constantly low temperature of 70° C. for example. Such cooling stretches are often operated using helium, which is extremely expensive. Accordingly, unnecessary cooling must be prevented so as not to unnecessarily increase the operating costs of the drawing tower plant. For this reason also, an accurate knowledge of the temperature of the glass fibre is important. In addition, at the end of the cooling stretch, glass fibres are usually provided with a coating. A prerequisite for this coating is that the glass fibre be at a constant temperature in order to minimize fluctuations in the thickness and concentricity of the close-tolerance coating. Knots and constrictions can also arise in drawing towers due to a dripping effect if the temperature of the glass fibre does not correspond to the optimum temperature characteristics of the coating.

Attempts were made to determine the temperature of such moving strands, such as glass fibres or wires, by means of a thermal imaging camera. In this case, the strand to be measured is imaged by means of a lens system focused on the thermal imaging camera. The temperature is then determined from the maximum value of the measuring values detected by the thermal imaging camera. However, this procedure has not proven reliable in practice. A key problem is a quick movement of the strands to be measured in relation to the time constant of the pixels of the thermal imaging camera. For example, high-frequency vibrations of the glass fibres conveyed along their longitudinal axis inevitably occur in drawing towers for producing glass fibres. For example, glass fibres about 125 µm in diameter can easily sway by 1 millimetre both transversely and longitudinally to the measuring plane in a drawing tower. Typical thermal time constants of standard thermal imaging sensors are in the range of 10 milliseconds. Other movements during production or a non-orthogonal orientation toward the imaging thermal imaging camera cause measuring errors. During manufacture the strand can also be subject to defocusing, for example due to a slow wandering of the fibre away from the centre due to a preform possibly not standing exactly vertically. Depending on the glass fibre manufacturer, this may possibly be identified, but only corrected from a certain extent onwards.

Particularly problematic are the explanatory difficulties with strands to be measured, of which the temperature signal only stands out a little from the temperature signal of a background. This is the case with glass fibres made out of quartz glass for example, which emit thermal radiation in an infrared wavelength-range from approximately 7 to 14 µm, which is regularly interesting for thermal imaging cameras, almost like a black body (emissivity e=0.95). A further problem lies in the fact that the strands to be measured, for example metal wires or glass fibres, are of smaller dimensions than the optical resolution capacity of the imaging system of thermal imaging camera and lens system.

All these problems mean that currently, a sufficiently accurate and reliable non-contact temperature measurement of strands of the type described using thermal imaging sensors is not possible.

Starting from the prior art explained, the invention is therefore based on the object to provide a method of the aforementioned type, using which the temperature of strands, such as wires and glass fibres, can be measured accurately and reliably.

BRIEF SUMMARY OF THE INVENTION

The invention solves the object by means of a method for determining the temperature of a strand. The method comprises disposing or conveying the strand in the direction of its longitudinal axis along a background radiator of known temperature. While it is being disposed or conveyed, the strand is then received using a spatially resolving thermal imaging sensor in front of the background radiator. An integral is formed or taken across a measuring value area of the thermal imaging sensor, which, at all times, completely detects the strand portion located in front of the background radiator. The temperature of the strand is deduced by comparing the formed integral with a reference value.

According to the invention the strand is conveyed in the direction of its longitudinal axis, along a background radiator, during which it is received by a spatially resolving thermal imaging sensor, in particular a line sensor or surface sensor (thermal imaging camera). The measuring area formed by the thermal imaging sensor using its lens system, if applicable, may completely detect, at all times, the width of the strand portion located in front of the background radiator at the time of measurement and, furthermore, at least one part of the background radiator located behind it. This detection may be done despite the movements, or respectively deviating positions of the strand, which occur in operation.

The teaching according to the invention is based on the fact that, instead of the maximum value of the measuring values of the thermal imaging sensor, it is the integral across all the measuring values in the evaluated measuring value area, which is formed, that is, the area of the radiated pixels or the like of the measuring value area. In this case, this integral comprises both the strand portion located in front of the background radiator at the respective time of measurement as well as the background radiator provided that it is located in the measuring value area. The temperature of the strand can be deduced by comparing this integral with, in particular differentiating it from, a reference value. Here, the invention is based on the realization that, given a defocusing or a movement of the strand for example, the integral evaluated according to the invention always substantially reproduces all the information about the temperature of the strand. Therefore, if the reproduction of the strand on the thermal imaging sensor is based on a normal distribution as an approximate representation of a model, given this normal distribution for different focusing positions of the strand, a constant value for the integral always results, since width and height of the normal distribution both change in accordance with each other. This means that the integral across the whole of the measuring value area is approximately proportional to the temperature and the dimensions of the strand and only slightly depends on the focusing which results from the position of the strand. In contrast to the evaluation of the maximum of this normal distribution, which considerably depends on the focusing, the method according to the invention provides reliably correct temperature values even given defocusing or a variable focusing.

Since the background temperature of the background radiator is known, it is possible, given knowledge of the dimensions and emissivity of the strand, for example from a comparison between the integral across the measuring value area and the strand located in the measuring value area on the one hand and without strand located in the measuring value area on the other, to determine the absolute strand temperature, even if the thermal imaging sensor and its lens system are not optimally focused on the strand, or respectively the position of the strand with respect to the focusing level of the thermal imaging sensor changes. In this case, it is possible, during a suitable process of calibration, to determine the background temperature of the background radiator as integral across the measuring value area of the thermal imaging sensor without strand and referencing the scalar thus received, using a temperature sensor which indicates the corresponding temperature of the background radiator.

The inventors have therefore realized that an oscillating strand only distributes its thermal radiation across a fairly large portion of the measuring value area, hence integration across the measuring value area produces a temperature value which is independent of whether the strand is in a stationary position or is defocused due to movement. Furthermore, using the method according to the invention, it is also possible to measure the temperature of very thin strands, of which the diameters are known, after a calibration process. Even very small differences in temperature between the strand and the background radiator can be determined accurately according to the invention.

Based on the fact that the method according to the invention is independent of a focusing or respectively defocusing of the strand with respect to the thermal imaging sensor and its lens system if applicable, a defocusing can even be induced deliberately, for example, in order to prevent the maximum value of the thermal imaging sensor from being exceeded, and the measuring values thereby reduced. Even skewed positions of the thermal imaging sensor, or respectively the level of a surface sensor, with regard to the strand to be measured, are unproblematic.

If the strand, for example a wire or a glass fibre, vibrates around a central position for example, as explained, a constant value is produced on an average for the integral evaluated according to the invention, which is largely independent of the focusing. For a strand moving in the direction of the thermal imaging sensor or away from the thermal imaging sensor, the measured temperature does indeed still depend on its position to a certain extent, since this results not only in a change of the focusing position, but also a change in the overall amount of heat reaching the thermal imaging sensor. However, this dependency can be minimized by compensatory measures, in particular by making the determined temperature of reference surfaces of the thermal imaging sensor relative to one another. In addition, in this respect, the method according to the invention has surprisingly been shown to provide reliably accurate values even if the distance between the strand and the thermal imaging sensor varies. This is surprising inasmuch as the overall amount of heat emitted by an object, which reaches the thermal imaging sensor, always depends on the distance quadratically. The integration across the measuring value area according to the invention still enables the achievement of reliable measuring results.

As has already been explained in principle, it is in particular the integral across the measuring value area without strand located in front of the background radiator, which can be selected as reference value. Based on a corresponding calibration, an absolute value for the temperature of the strand can be determined, by comparing the integral formed according to the invention with this reference value.

The background radiator can be a near black-body radiator. In this respect, a radiator as close to being a black-body radiator as possible is used inasmuch as this is feasible and can be achieved with reasonable efforts. The temperature of the background radiator can be measured by means of a temperature-measuring apparatus. Furthermore, the background radiator can be heated to a predetermined temperature by means of a heating apparatus. Using the background radiator and its known temperature, the thermal imaging sensor can be calibrated to this temperature value.

According to a further embodiment, the temperature of the strand can be deduced, by comparing the formed integral with the reference value by taking an assumed or measured diameter of the strand into account. The cross-section or respectively the diameter of the generally circular cylindrical strand must be known in order to receive a temperature result which is independent of diameter. Depending on the field of application, all that is required is to assume a predetermined diameter value and to base the temperature determination thereon. However, the diameter value can also be determined separately by means of a suitable measuring apparatus and then to base the temperature determination on this measured diameter value.

Furthermore, the temperature of the strand can be deduced by comparing the formed integral with the reference value, while taking an assumed or measured emissivity of the strand into account. The emissivity of the strand must be known in order to be able to deduce an absolute temperature value from the image of the thermal imaging sensor. Depending on the constancy of the emissivity in the respective field of application, all that is again required is to assume an emissivity and to base the measurement thereon. However, determining the emissivity can also be necessary, in particular if this is subject to considerable fluctuations.

A further embodiment provides that the strand is predominantly or wholly surrounded by the background radiator. In particular the background radiator can be a cavity radiator with an inlet opening and an outlet opening, wherein the strand is conveyed right through the inlet opening and outlet opening, through the cavity radiator, and wherein the cavity radiator comprises at least one measuring opening, through which the spatially resolving thermal imaging sensor detects the strand in front of the inner wall of the background radiator. Thermal radiation is known to be determined by means of three parameters according to the following equation:

$$e+r+t=1$$

Here, e determines the emissivity, r the reflectivity, and t the transmissivity. For example, with metal wires it can be assumed that the transmissivity in the infrared measuring range for example is practically zero. The above equation can then be simplified as follows:

$$e+r=1$$

In an ideal black-body radiator the reflectivity is zero, that means, e=1 applies. In contrast, with real objects, for example with metal wires, the reflectivity r is usually much higher than the emissivity e. Moreover, the emissivity changes, depending on factors such as make-up of the surface or temperature. Therefore, the emissivity of the moving strand to be measured is often not known in practice, in particular with metal wires.

Hence, according to the aforementioned embodiments, by externally radiating the strand to be measured on all sides, the portion of the radiation missing by 1 due to the emissivity e<1 in the equation e+r=1 can be compensated by the external radiation of the cavity radiator. In particular, the thermal radiation guided onto the strand to be measured by the cavity radiator is reflected by the object according to its reflectivity r, so that the missing part of the thermal radiation is as it were 'filled' to 1 by being externally radiated. Based thereon, non-contact temperature sensors can be calibrated in reproducible temperature measuring values even if emissivity is not known. A method such as this for the non-contact determination of the temperature given unknown emissivity is known for example from WO 2014/090994 A2 which stems from the present applicant.

The total measuring area of the thermal imaging sensor can always be selected as measuring value area. However, it is of course also conceivable that, instead of using the total measuring area, that is, in particular all the pixels of the thermal imaging sensor comprising the region, merely a section of the total measuring area of the thermal imaging sensor can be used as measuring value area (Region of Interest (ROI)). In this respect, the effect is that, with line sensors or surface sensors for example, the individual pixels can differ in initially unknown manner with regard to their responsiveness and their dependency on different temperature values, due to inevitable manufacturing tolerances. This can concern both a different zero point of the individual pixels and a different increase in dependency on the temperature. If merely a part of the total measuring area of the thermal imaging sensor is selected as measuring value area, standardization is then required, in order to eliminate the aforementioned different temperature dependency. On the other hand, if the total measuring area of the thermal imaging sensor is used as measuring value area, such a standardization is not required.

In a particularly practical manner, an infrared thermal imaging camera (so-called bolometer) can be used as thermal imaging sensor.

As explained before, the strand can be a glass fibre or a metal wire. The metal wire can act as metal conductor for example. If the strand is a metal wire, it can, for example, be provided with a plastic insulation in an extrusion system after the temperature determination according to the invention. With regard to glass fibres, the requirement and the problems when determining the temperature have been explained at the outset. A particular problem arising here, which is solved according to the invention, is an emissivity of approximately 0.95 of typical glass fibres made out of quartz glass. As also explained at the outset, reliably accurate temperature values can still be determined using the method according to the invention.

As also explained at the outset, strands with smaller dimensions can be measured reliably, using the method according to the invention. Accordingly, for example, a circular cylindrical strand can be less than 500 μm, preferably less than 250 μm, further preferably less than 150 μm in diameter. For example, glass fibres are typically approximately 125 μm in diameter. The permissible thickness deviation is below 10 μm as a rule, in particular non-coated glass fibres can have permissible thickness deviations of below 1μm. Very thin strands can be reliably measured according to the invention, even if their diameter is less than the resolution capacity of the thermal imaging sensor and its lens system, if applicable.

According to a further embodiment, the strand can be cooled in a cooling apparatus, preferably a helium cooling apparatus, before or after the conveying along the background radiator and in accordance with the temperature determination according to the invention.

Furthermore, the strand can be provided with a coating in a coating apparatus after the conveying along the background radiator and particularly after the guidance through a cooling apparatus, in accordance with the temperature determination according to the invention.

In particular, the method according to the invention can be carried out in a glass-fibre drawing tower.

BRIEF DESCRIPTION OF THE DRAWINGS

An exemplary embodiment of the invention is explained in greater detail in the following figures. The figures show schematically.

Unless otherwise stated, in the figures the same reference numbers denote the same objects.

DETAILED DESCRIPTION OF THE INVENTION

Figure 1:
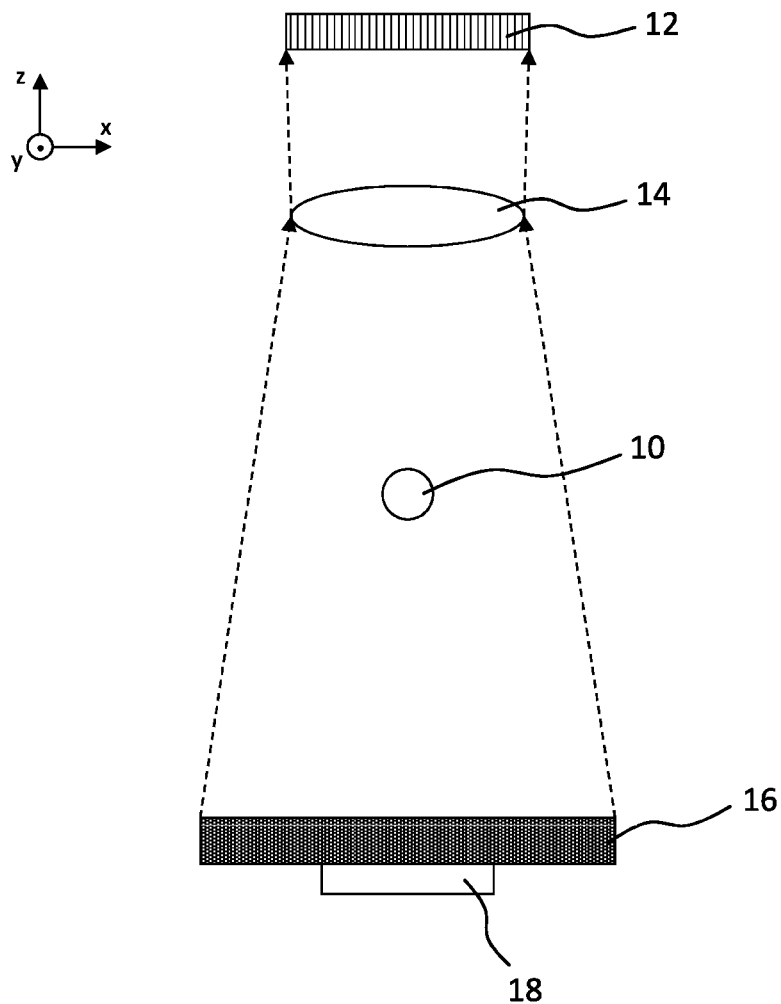
FIG. 1 illustrates a top schematic view or an embodiment of a measuring arrangement.
Figure 2:
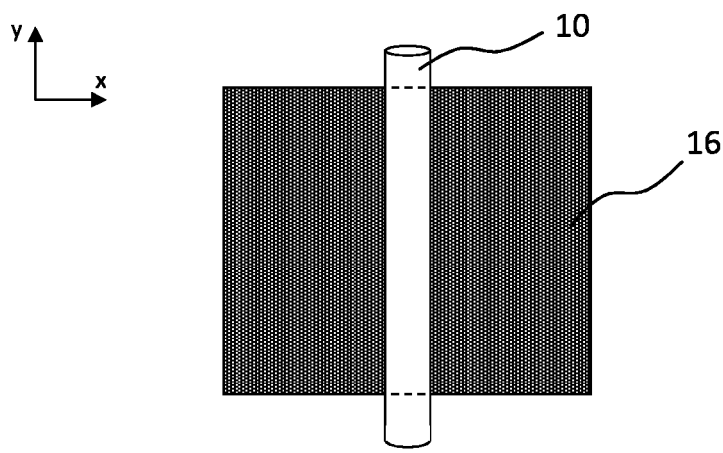
FIG. 2 illustrates a side schematic view of the embodiment of the measuring arrangement from FIG. 1.

FIGS. 1 and 2 show a measuring arrangement for carrying out the method according to the invention. A circular cylindrical strand, for example a metal wire or a glass fibre, guided through the measuring arrangement, is shown in sections next to reference number 10. A thermal imaging sensor 12 with a lens system 14, here a lens 14, detects the strand 10 in front of a background radiator 16, here a substantially black-body radiator. The temperature of the background radiator 16 is determined by a temperature sensor 18.

During the conveying along the background radiator 16, the strand 10 is received in front of the background radiator 16 by the thermal imaging sensor 12, for example an infrared line sensor or surface sensor 12. An evaluation apparatus not shown in greater detail in the figures determines the integral across the whole of the measuring area of the thermal imaging sensor 12, for example as measuring value area, and forms the difference between this integral and a reference value. In the present example, the integral across the measuring value area can be selected as a reference value, without strand 10 guided through the measuring arrangement. Given the known diameter and emissivity of strand 10, based thereon and taking into account the temperature of the background radiator 16 measured using the temperature sensor 18, the temperature of the strand 10 can be reliably and accurately determined in the manner according to the invention.

Figure 3:
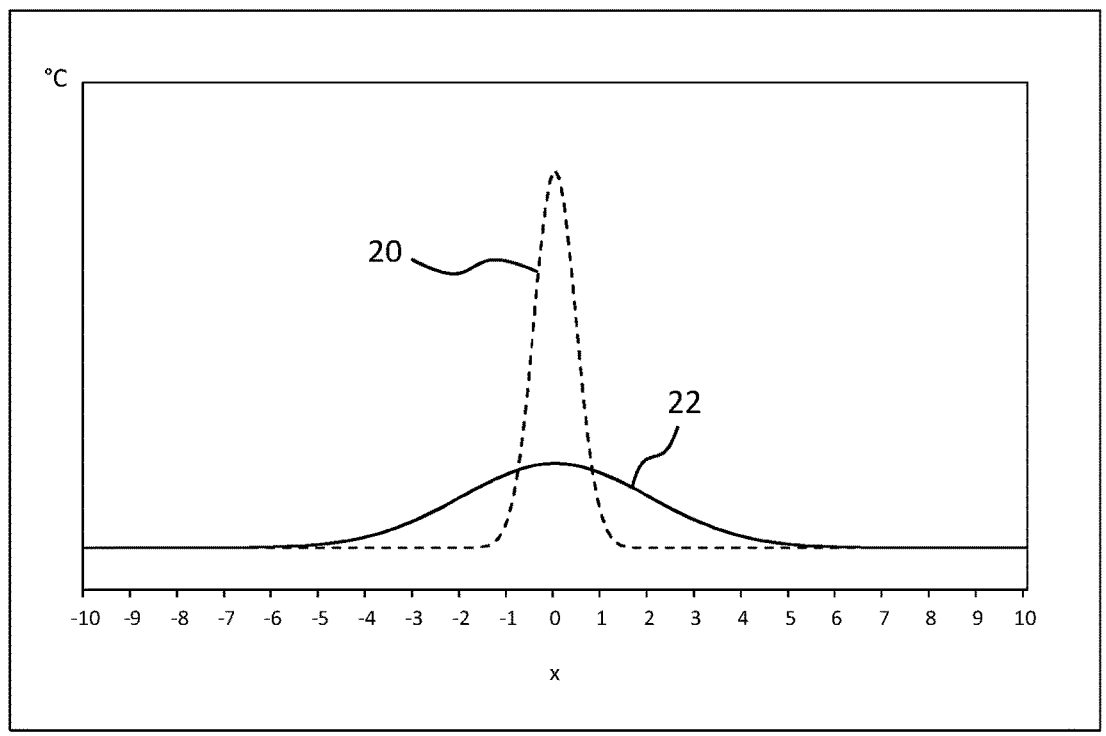
FIG. 3 illustrates two theoretical measuring results from the embodiment of the measuring arrangement of FIG. 1.

This is to be explained in even greater detail by means of the diagrams in FIGS. 3 to 6. Given the same strand and same temperature, FIG. 3 shows the theoretical progress of the measuring signal along the x direction in FIGS. 1 and 2 next to the reference number 20 for a stationary strand 10 on the one hand, and next to reference number 22 for an oscillating strand 10. The temperature measured by the thermal imaging sensor is applied over the entire area. It can be understood that the maximum values of both the curves applied in FIG. 3 differ considerably, although the strand has the same temperature in both cases. This means that the evaluation of the maximum value for a temperature determination entails a considerable measuring error.

Figure 4:
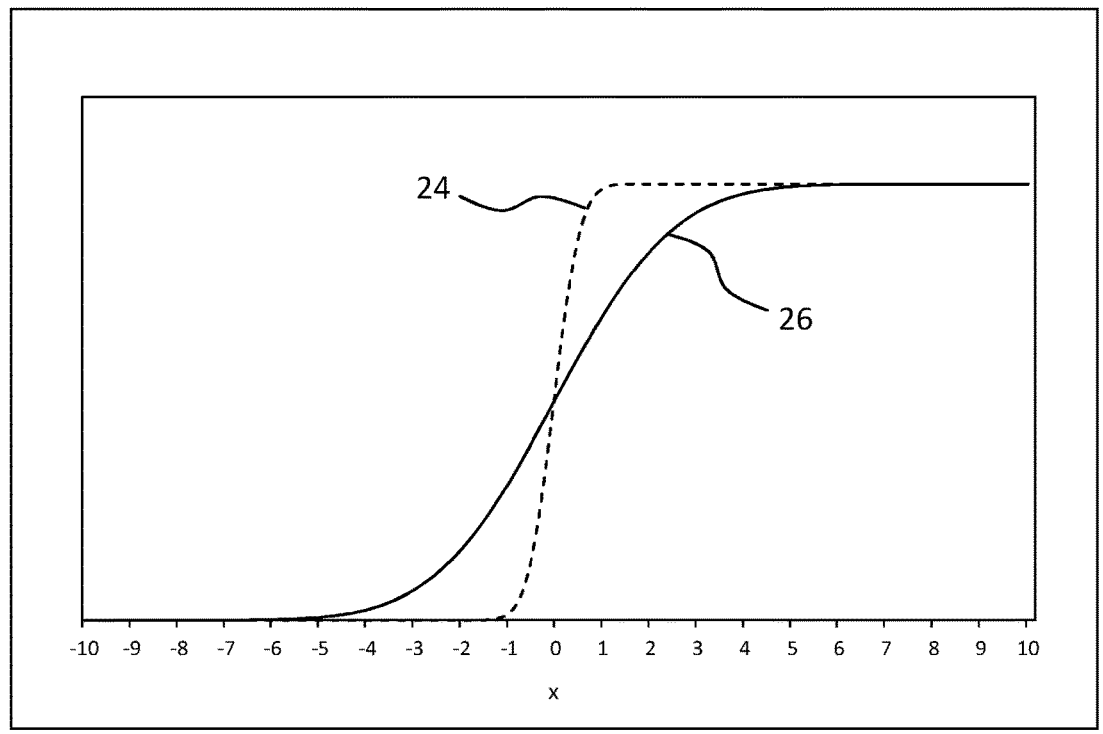
FIG. 4 illustrates two integrals formed or taken from the theoretical measuring results from FIG. 3.

Next to the reference number 24, FIG. 4 shows the integral across the curve 20 from FIG. 3, and next to the reference number 26 the integral across the curve 22 from FIG. 3. The integral results in the area of each surface below the curves 24, 26. The fact that the surface content below the curves 24, 26 is practically identical is clear in FIG. 4, so that determining the temperature based on the integral is independent of the oscillation of the strand 10 or respectively a blurring due to movement.

Figure 5:
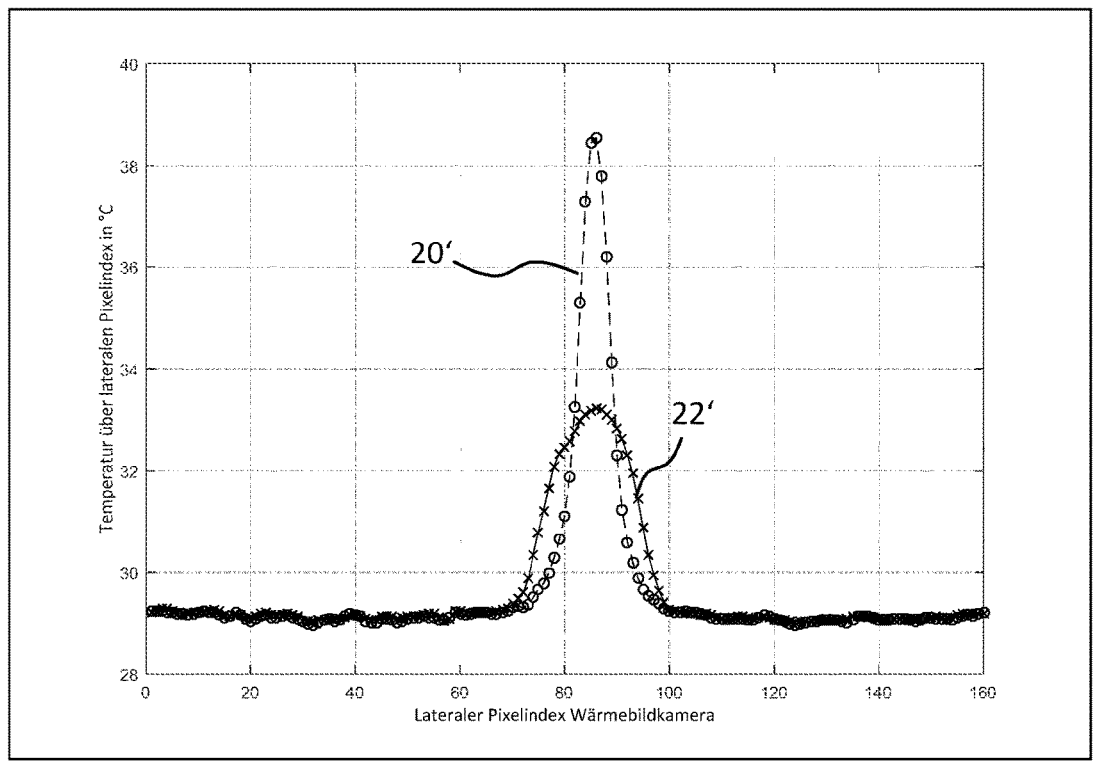
FIG. 5 illustrates an example of two real strand temperature measurements from an embodiment of the measuring arrangement.

Real measuring values are applied in FIG. 5 by way of illustration. The progress of a measuring value for a good focusing and a stationary strand is shown next to the reference number 20'. Given the same temperature and same strand 10, the progress of a measuring value for a poor focusing, or respectively a vibration of the strand 10, is shown next to reference number 22'.

Figure 6:
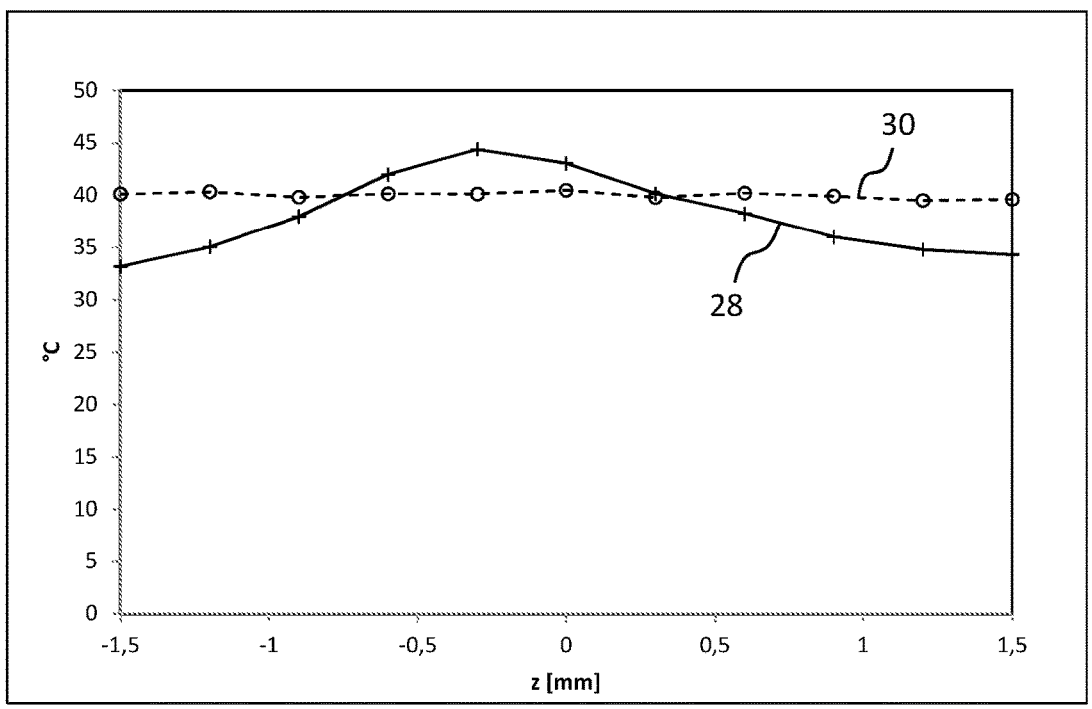
FIG. 6 illustrates a comparison between the disclosed strand temperature measuring method and a strand temperature measurement method according to the prior art.

Next to the reference number 28, the diagram in FIG. 6 shows the resulting temperature values according to the method of the prior art with an evaluation of the maximum of the measuring curve for the same strand and same strand temperature, but in FIG. 1 with the position of the strand 10 changing in z direction, that is, in the direction towards the thermal imaging sensor 12 or away from the thermal imaging sensor 12. It can be understood that the changing position of the strand 10 with respect to the focus of the thermal imaging sensor 12 and its lens 14 produces considerable deviations from the determined temperature value. In other words, the temperature value determined during an evaluation of the maximum of the measuring curves shown in FIG. 5 greatly depends on the position of the strand 10 with respect to the focusing level of the thermal imaging sensor 12 and its lens 14.

The same progress of the temperature measuring value for the method according to the invention is shown next to the reference number 30. In this case it is clear that the position of the strand 10 in z direction with respect to the focusing level of the thermal imaging sensor 12 and its lens 14 has no appreciable influence on the result of the temperature determination according to the invention.

The invention claimed is:

1. A method for determining a temperature of a thin vibrating strand of known diameter, the method comprising:
    disposing the thin vibrating strand along a background radiator of known temperature, the strand being oriented along its longitudinal axis;
    receiving the strand using a spatially resolving thermal imaging sensor in front of the background radiator while the strand is being disposed along its longitudinal axis, the spatially resolving imaging sensor forming a measuring value area;
    detecting a complete width of the strand in the measuring value area that is in front of the background radiator and at least a portion of the background radiator behind the strand;
    forming an integral across the measuring value area; and
    deducing the temperature of the strand by comparing the formed integral with an integral of the measuring value area without the strand positioned in front of the background radiator.

2. The method according to claim 1, wherein the background radiator is a near black-body radiator.

3. The method according to claim 1, wherein a temperature of the background radiator is measured by means of a temperature-measuring apparatus.

4. The method according to claim 1, wherein the background radiator is heated to a predetermined temperature by means of a heating apparatus.

5. The method according to claim 1, wherein the temperature of the strand is further deduced by taking into account an assumed or measured diameter of the strand.

6. The method according to claim 1, wherein the temperature of the strand is further deduced by taking into account an assumed or measured emissivity of the strand.

7. The method according to claim 1, wherein the strand is substantially surrounded by the background radiator.

8. The method according to claim 7, wherein the background radiator is a cavity radiator with an inlet opening and an outlet opening, wherein the strand is disposed through the inlet opening and the outlet opening and through the cavity radiator, and wherein the cavity radiator comprises at least one measuring opening through which the spatially resolving thermal imaging sensor detects the strand in front of an inner wall of the background radiator.

9. The method according to claim 1, wherein a whole measuring area of the thermal imaging sensor is selected as the measuring value area.

10. The method according to claim 1, wherein the thermal imaging sensor is an infrared thermal imaging camera.

11. The method according to claim 1, wherein the strand comprises a glass fibre or a metal wire.

12. The method according to claim 1, wherein the strand comprises a diameter of less than 500 µm.

13. The method according to claim 1, wherein the strand comprises a diameter of less than 150 µm.

14. The method according to claim 1, wherein the strand is cooled in a cooling apparatus.

15. The method according to claim 14, wherein the strand is cooled before or after it is disposed along the background radiator.

16. The method according to claim 14, wherein the cooling apparatus is a helium cooling apparatus.

17. The method according to claim 1, wherein the strand is provided with a coating in a coating apparatus after being disposed along the background radiator.

18. A glass fibre drawing tower configured to carry out the method according to claim 1.

* * * * *